(12) United States Patent
Cheung et al.

(10) Patent No.: US 10,902,138 B2
(45) Date of Patent: Jan. 26, 2021

(54) DISTRIBUTED CLOUD STORAGE

(71) Applicant: PhazrIO Inc., Los Angeles, CA (US)

(72) Inventors: Chi-Kwan J. Cheung, Santa Monica, CA (US); Donald C. D. Chang, Thousand Oaks, CA (US); Juo-Yu Lee, Camarillo, CA (US); Steve K. Chen, Pacific Palisades, CA (US); Tzer-Hso Lin, Chatsworth, CA (US)

(73) Assignee: PhazrIO Inc., Camarillo, CA (US)

( * ) Notice: Subject to any disclaimer, the term of this patent is extended or adjusted under 35 U.S.C. 154(b) by 279 days.

(21) Appl. No.: 15/467,983

(22) Filed: Mar. 23, 2017

(65) Prior Publication Data

US 2017/0286710 A1    Oct. 5, 2017

Related U.S. Application Data

(60) Provisional application No. 62/315,009, filed on Mar. 30, 2016.

(51) Int. Cl.

| G06F 21/62 | (2013.01) |
| H04L 29/06 | (2006.01) |
| H04L 9/08 | (2006.01) |
| H04L 29/08 | (2006.01) |
| H04L 9/32 | (2006.01) |

(52) U.S. Cl.
CPC ........ *G06F 21/6218* (2013.01); *H04L 9/0863* (2013.01); *H04L 9/0894* (2013.01); *H04L 9/3226* (2013.01); *H04L 9/3236* (2013.01); *H04L 63/0435* (2013.01); *H04L 63/083* (2013.01); *H04L 67/1097* (2013.01); *G06F 2221/2147* (2013.01); *H04L 2463/061* (2013.01)

(58) Field of Classification Search
CPC ............. G06F 21/6218; G06F 21/6227; G06F 2221/2147; H04L 63/083; H04L 9/0894
See application file for complete search history.

(56) References Cited

U.S. PATENT DOCUMENTS

| 2011/0252233 A1* | 10/2011 | De Atley | G06F 11/1458 713/165 |
| 2011/0252236 A1* | 10/2011 | De Atley | G06F 11/1464 713/168 |

(Continued)

*Primary Examiner* — Harunur Rashid
(74) *Attorney, Agent, or Firm* — Shun Yao; Park, Vaughan, Fleming & Dowler LLP

(57) ABSTRACT

One embodiment provides a storage management system. During operation, the system identifies a data file of a user. The system obtains an encrypted client registry from a primary cloud provider in a plurality of cloud providers that provide cloud storage to the user and retrieves a key associated with a device of the user by decrypting the encrypted client registry using a hash of a password associated with the user. The system obtains credentials of the plurality of cloud providers by decrypting a locally stored cloud configuration using the key and generates a plurality of coded fragments from the data file based on a generator matrix of erasure encoding. The number of coded fragments is determined based on a number of the cloud providers associated with the user. The system selects a respective coded fragment for uploading to a corresponding cloud provider in the plurality of cloud providers.

20 Claims, 12 Drawing Sheets

(56) References Cited

U.S. PATENT DOCUMENTS

| | | | |
|---|---|---|---|
| 2013/0145447 A1* | 6/2013 | Maron | G06F 21/31 726/6 |
| 2014/0122866 A1* | 5/2014 | Haeger | H04L 63/061 713/153 |
| 2014/0181301 A1* | 6/2014 | Yendluri | G06F 9/5072 709/225 |
| 2014/0325622 A1* | 10/2014 | Luk | H04L 63/083 726/6 |
| 2016/0063026 A1* | 3/2016 | Mokhtarzada | G06F 16/1824 707/617 |
| 2017/0061141 A1* | 3/2017 | Redberg | G06F 21/602 |
| 2017/0104736 A1* | 4/2017 | Seul | G06F 16/13 |

\* cited by examiner

DISTRIBUTED CLOUD STORAGE

RELATED APPLICATION

This application claims the benefit of U.S. Provisional Application No. 62/315,009, titled "Data Storage in Cloud," by inventors Chi-Kwan J. Cheung, Donald C. D. Chang, Juo-Yu Lee, Steve K. Chen, and Tzer-Hso Lin, filed 30 Mar. 2016, the disclosure of which is incorporated by reference herein.

The present disclosure is related to U.S. patent application Ser. No. TBD, Attorney Docket No. PIO16-1001NP, titled "High Performance Data Redundancy and Fault Tolerance," by inventors Donald C. D. Chang, Chi-Kwan J. Cheung, Lara Dolecek, Gary N. Jin, and Rocky Chi-Ray Lin, filed TBD, the disclosure of which is incorporated by reference herein.

BACKGROUND

Field

This disclosure is generally related to efficient data management in a cloud. More specifically, this disclosure is related to a method and system for facilitating secure distribution of data across a plurality of cloud providers.

Related Art

With the advancement of computer and network technologies, various operations performed by users of different applications have led to extensive use of web services. This proliferation of the Internet and Internet-based user activity continues to create a vast amount of digital data. For example, a user may generate data from different applications, such as mobile applications running on different platforms, as well as web-interfaces running on different browsers in different operating systems.

To ensure safety, the user can store this data in a cloud storage service provider (which can also be referred to as a cloud provider). A user can upload and access the data via the Internet. This "anywhere-anytime" model has made cloud providers a popular choice for data storage. However, the size of the cloud storage provided by a cloud provider is usually limited. Hence, a user may use multiple cloud providers to upload the data. For example, the user may upload image data to one cloud provider and documents to another cloud provider. However, uploading data to a cloud provider may impose limitations on the data, which can include data mining and information gathering from the stored data.

Although a number of cloud providers offer storage services, some problems still remain in efficiently storing data using multiple cloud providers.

SUMMARY

One embodiment provides a storage management system that facilitates uploading a data file of a user across a plurality of cloud providers. During operation, the system identifies a data file to be uploaded to a cloud storage of the user. The system then obtains an encrypted client registry from a primary cloud provider in a plurality of cloud providers that provide cloud storage to the user and retrieves a key associated with a device of the user by decrypting the encrypted client registry using a hash of a password associated with the user. The system obtains credentials of the plurality of cloud providers by decrypting a locally stored cloud configuration using the key and generates a plurality of coded fragments from the data file based on a generator matrix of erasure encoding. The number of the coded fragments can be determined based on a number of the cloud providers associated with the user. It should be noted that the number of the coded fragments is configurable. The system selects a respective coded fragment for uploading to a corresponding cloud provider in the plurality of cloud providers.

In a variation on this embodiment, the credentials for the primary cloud provider are included in an encrypted data structure of an operating system of the device.

In a variation on this embodiment, the system stores a file registry in the primary cloud provider. The file registry includes one or more of: a name and a path of the data file, location and order of a respective coded fragment of the data file, and additional metadata.

In a variation on this embodiment, the system initializes a lock for the data file. This lock prevents another device of the user from simultaneously updating the file registry, which can lead to corruption of the file registry.

In a variation on this embodiment, the system verifies the validity of the password by generating a hash of the hash of the password, retrieving a password key from the primary cloud provider, and comparing the generated hash of the hash of the password with the password key. The password key is a previously generated hash of the hash of the password.

In a variation on this embodiment, the system generates the coded fragments from the data file by obtaining a plurality of data elements from the data file, converting a respective data element in the plurality of data elements to a numerical representation, representing the numerical representations as a data matrix, and multiplying the data matrix with the generator matrix.

In a variation on this embodiment, if the system detects a request for a new password, the system decrypts the encrypted client registry using the hash of the password, obtains a new password from the user, and encrypts the decrypted client registry using a hash of the new password. The system also stores a new password key comprising a hash of the hash of the new password in the primary cloud provider.

In a variation on this embodiment, the system maintains an unencrypted client registry by generating a plurality of coded fragments of the unencrypted client registry and storing a respective coded fragment of the unencrypted client registry in a corresponding cloud provider.

In a further variation, if the system detects a request for resetting the password, the system obtains credentials for a respective cloud provider in the plurality of cloud providers from the user and obtains a respective coded fragment of the unencrypted client registry from the corresponding cloud provider using the credentials of that cloud provider. The system then generates the unencrypted client registry from the obtained coded fragments of the unencrypted client registry. If the unencrypted client registry is successfully generated, the system prompts the user for a new password.

In a further variation, if the system detects a marker indicating that the encrypted client registry has been updated, the system updates the unencrypted client registry by retrieving the encrypted client registry from the primary cloud provider, decrypting the encrypted client registry using the hash of the password, and generating a plurality of coded fragments of the decrypted client registry.

BRIEF DESCRIPTION OF THE FIGURES

In the figures, like reference numerals refer to the same figure elements.

DETAILED DESCRIPTION

Figure 1A:
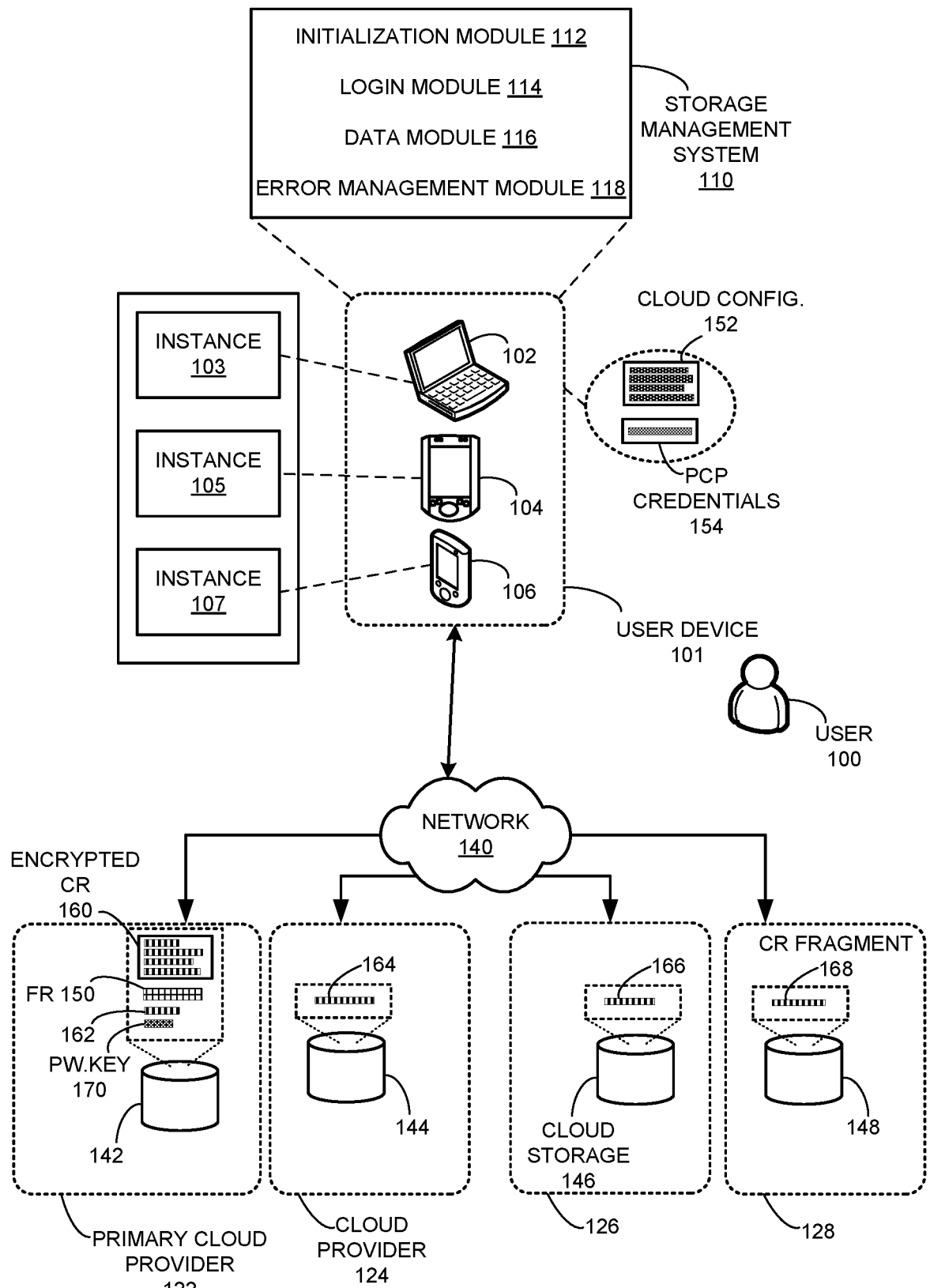
FIG. 1A illustrates an exemplary storage management system facilitating data storage across multiple cloud providers, in accordance with an embodiment of the present invention.

The following description is presented to enable any person skilled in the art to make and use the embodiments, and is provided in the context of a particular application and its requirements. Various modifications to the disclosed embodiments will be readily apparent to those skilled in the art, and the general principles defined herein may be applied to other embodiments and applications without departing from the spirit and scope of the present disclosure. Thus, the present invention is not limited to the embodiments shown, but is to be accorded the widest scope consistent with the principles and features disclosed herein.

Overview

In embodiments of the present invention, the problem of efficiently facilitating data storage across a plurality of cloud providers (CPs) while preventing access to user data is solved by generating coded fragments of a data file and uploading a respective coded fragment to a corresponding CP. Any service provider that allows a user to upload, access, and edit a file to cloud storage provided by the service provider can be referred to as a cloud provider. With existing technologies, when the user stores data on the cloud storage provided by a CP, the CP has access to the stored data. Some CPs may commercialize the stored data, and, in some cases, may even claim ownership of the stored data. Storing data on the cloud storage of a CP can also be prone to a hacker's intervention. As a result, the user of the CP may easily lose control of the stored data.

To solve this problem, embodiments of the present invention provide a storage management system that combines resources from multiple CPs to store the coded fragments of a data file (e.g., multiplexed pieces of the data file) of a user. The original data file can be reconstructed without data loss using a subset of the coded fragments. The number of coded fragments required for the reconstruction can be configurable. In some embodiments, the system can use numerical operation-based erasure coding to generate the coded fragments. For example, in a (6,4) erasure-coding-based storage system, the original data is encoded into 6 coded fragments. The system can use any 4 of the coded fragments to retrieve the original data.

Suppose that the user has access to a plurality of CPs (e.g., Google Drive, Microsoft OneDrive, Dropbox, Box, etc.). During operation, the system obtains the login credentials of a respective CP. The system delegates one of the CPs as a primary CP (PCP). When the user provides a data file to the system for uploading, the system generates coded fragments of the data file and uploads a respective coded fragment to a corresponding CP. Since these CPs can be geographically dispersed in the cloud, a subset of the coded fragments can survive a large regional outage.

Furthermore, to increase data survivability, the system can check the coded fragments for integrity using a hash function (e.g., an MD5 hash function). Missing or corrupted coded fragments can be restored or migrated to another CP. If a CP becomes unavailable, the system can deactivate the CP and migrate the coded fragments in the CP to other CPs without interruption of service. In this way, the user can control the user data without being tied to a CP or a pricing plan.

In some embodiments, the system uses numerical operations to efficiently perform encoding and decoding, and makes an erasure-coding-based approach suitable for data streams. The system obtains a number of bits from the data file and represents the bits in a numerical representation as a data element. The system then forms a data matrix comprising a plurality of such data elements in corresponding numerical representations and determines a generator matrix for the data matrix. The system multiplies the data matrix and the generator matrix to generate the coded fragments.

The numerical operation-based erasure coding represents user data in numerical presentations, such as integers, doubles, big integer, floating points, decimal floating points, etc., instead of using a Galois finite field lookup matrix. The system can use a subset of coded fragments and a corresponding decoder matrix to retrieve the data elements. The decoder matrix corresponds to the sub-matrix that has been used to generate the subset of coded fragments. If one or more of the coded fragments becomes unavailable (e.g., becomes corrupted), the system uses a subset of coded fragments to reconstruct the corrupted coded fragments based on a recovery matrix. It should be noted that the decoder matrix and recovery matrix can be obtained from a transformation of the corresponding sub-matrix of the generator matrix (e.g., based on an inverse operation on the sub-matrix).

Storage Management System

FIG. 1A illustrates an exemplary storage management system facilitating data storage across multiple cloud providers, in accordance with an embodiment of the present invention. In this example, a user 100 uses one or more user devices 102, 104, and 106 to access cloud storage 142, 144, 146, and 148 provided by CPs 122, 124, 126, and 128, respectively. Cloud storage 142 can indicate the portion of cloud storage (e.g., five gigabytes of storage) dedicated for user 100 on the storage devices of cloud provider 122. A user device can be any device that can access a CP via network 140 (e.g., a tablet, a smartphone, a computer, etc.). Examples of a CP include, but are not limited to, Google Drive, Microsoft OneDrive, Dropbox, and Box. Any of user devices 102, 104, and 106 can be referred to as user device 101. User device 101 is coupled with network 140. Network 140 can be a local or a wide area network, or the Internet.

With existing technologies, when a user stores data on a cloud storage provided by a CP, the CP has access to the stored data. For example, when user 100 stores data on cloud storage 142 provided by CP 122, CP 122 has access to the stored data. Furthermore, some CPs may commercialize the stored data, and, in some cases, may even claim ownership of the stored data. Storing data on the cloud storage of a CP can also be prone to a hacker's intervention. As a result, user 100 may easily lose control of the stored data.

To solve this problem, embodiments of the present invention provide a storage management system 110 that combines resources from CPs 122, 124, 126, and 128 to store the coded fragments of the data file of user 100. Instead of uploading a file to an individual CP, user 100 provides the file to system 110, which in turn, uploads the file across CPs 122, 124, 126, and 128. In some embodiments, system 110 can include an initialization module 112, a login module 114, a data module 116, and an error management module 118. During operation, user 100 installs system 110 on user device 101. In this example, instances of system 110 installed on user devices 102, 104, and 106 can be referred to as client instances 103, 105, and 107, respectively. Initialization module 112 of a respective client instance, such as client instance 103, obtains cloud configuration 152 for user 100. Cloud configuration 152 includes login credentials needed to access the user data for each of CPs 122, 124, 126, and 128.

One of the CPs can be selected as a PCP. The PCP for user 100 can be selected by user 100 (e.g., a configuration feature while obtaining cloud configuration). The PCP can also be selected by system 110 based on one or more criteria. Such criteria can include one particular CP required by system 110, a CP with a highest level of access, a CP with a largest cloud storage, and a CP that does not access user data. In this example, storage management system 110 selects CP 122 as the PCP. PCP 122 stores a file registry 150 and an encrypted client registry 160. File registry 150 includes information on a respective uploaded data file, the information associated with generating the coded fragments for the data file, and the location of each data fragment (e.g., similar to the metadata of a file system).

Client registry 160 includes information associated with a respective client instance, such as a client instance identifier and a client encryption key (CEK) associated with the client instance. In some embodiments, a client instance identifier can be a randomly generated a universally unique identifier (UUID). In some embodiments, a CEK is based on the Advanced Encryption Standard (AES) and is not stored in the device associated with the client instance. The length of the CEK can be determined based on the requirement of the encryption algorithm (e.g., 256-bit key for AES-256).

Initialization module 112 encrypts client registry 160 using a hash of a password of system 110. In some embodiments, the encrypted client registry 160 stores identification data that associates a user device (e.g., device operating system, device name, etc.) with a client instance (e.g., a client instance identifier). This password can be provided by user 100 following a password rule (e.g., with at least one uppercase letter, one number, and one symbol). Initialization module 112 can also calculate a second hash of the hash of the password and store it in a file 170 in cloud storage 142 of PCP 122. In this example, this file can be referred to as "pw.key." It should be noted that the name of pw.key 170 is merely for naming purposes, which can follow any naming convention.

Initialization module 112 also stores an unencrypted client registry. Suppose that client instance 103 is the initial client instance. Initialization module 112 of client instance 103 then generates coded fragments of client registry 160. Each of these client registry fragments 162, 164, 166, and 168 is stored in the cloud storage of a CP. In this example, client registry fragments 162, 164, 166, and 168 are stored in cloud storage 142, 144, 146, and 148, respectively. Since a coded fragment by itself does not reveal any plaintext data, accessing an individual client registry fragment does not reveal any portion of client registry 160. Client registry 160 can be reconstructed only by accessing at least a subset of client registry fragments 162, 164, 166, and 168, and the associated generator matrix. In some embodiments, such a subset can be configured to include each client registry fragment.

Initialization module 112 uses the CEK to encrypt cloud configuration 152, which is stored in device 102. Cloud configuration 152 includes information (e.g., credentials for CPs, keychain item names, etc.) required to log in to the CPs to access any user data. For client instance 103, cloud configuration 152 is stored in device 102 and cloud configuration 152 is encrypted by the CEK of device 102. Since the CEK is stored in PCP 122, even if a malicious party were to gain access to device 102, that malicious party would not get access to cloud configuration 152 without knowing the password of system 110. To facilitate access to PCP 122, system 110 stores login credentials 154 for PCP 122 in the secured storage provided by the operating system of device 102. For example, for the iOS operating system, PCP credentials 154 are stored in the keychain of iOS.

Figure 1B:
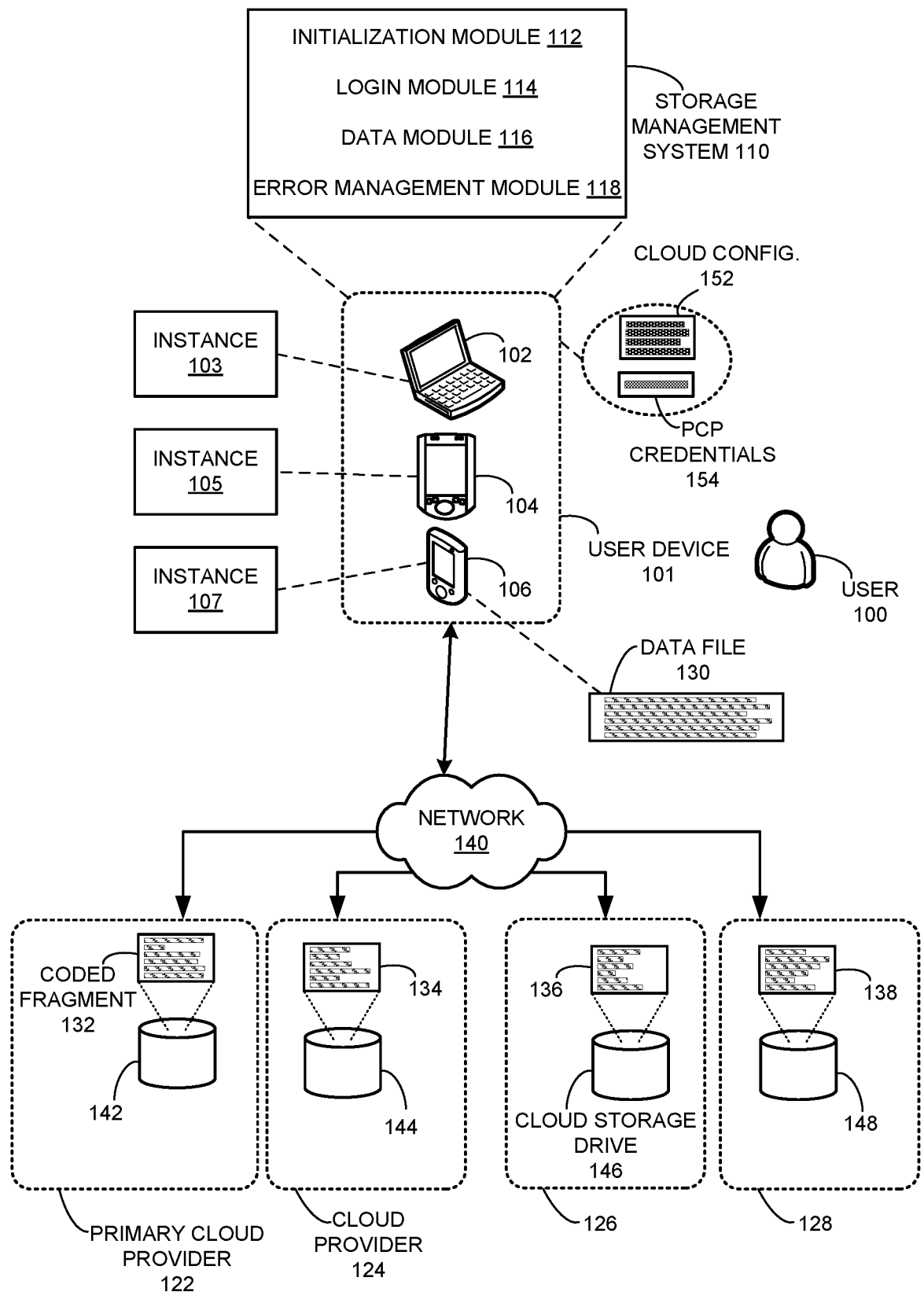
FIG. 1B illustrates an exemplary storage management system uploading a data file fragmented across multiple cloud providers, in accordance with an embodiment of the present invention.

FIG. 1B illustrates an exemplary storage management system uploading a data file fragmented across multiple cloud providers, in accordance with an embodiment of the present invention. During operation, user 100 provides the password to client instance 107 of system 110. Login module 114 verifies the password and prepares client instance 107 for operation. User 100 then provides data file 130 for uploading to client instance 107. Data module 116 generates coded fragments 132, 134, 136, and 138 of data file 130 and uploads the coded fragments to CPs 122, 124, 126, and 128, respectively. Data module 116 can use numerical operation-based erasure coding to generate coded fragments 132, 134, 136, and 138. Data module 116 can store the corresponding generator matrix in the file registry in PCP 122.

Any of client instances 103, 105, and 107 can reconstruct data file 130 without data loss using a subset of coded fragments 132, 134, 136, and 138. The number of coded fragments required for the reconstruction can be configurable. For example, data module 116 can generate coded fragments 132, 134, 136, and 138 in such a way that any three of them can be used to reconstruct data file 130. To retrieve data file 130, data module 116 obtains three error-free coded fragments from coded fragments 132, 134, 136, and 138 using cloud configuration 152. Data module 116 can also obtain the generator matrix from PCP 122. Data module 116 then uses the selected coded fragments and a decoder matrix to reconstruct data file 130.

Furthermore, to increase data survivability, error management module 118 can check the coded fragments for integrity using a hash function and/or reconstructed data file 130. Suppose that coded fragment 138 becomes unavailable (e.g., due to unavailability of CP 128). Data module 116 then generates data file 130 using coded fragments 132, 134, and 136. Error management module 118 can reconstruct coded fragment 138 using coded fragments 132, 134, and 136. In addition, user 100 can deactivate CP 128 using system 110 and migrate reconstructed coded fragment 138 to another CP without interruption of service. In this way, the user can control the user data without being tied to a CP or a pricing plan.

Numerical Representation

Figure 2:
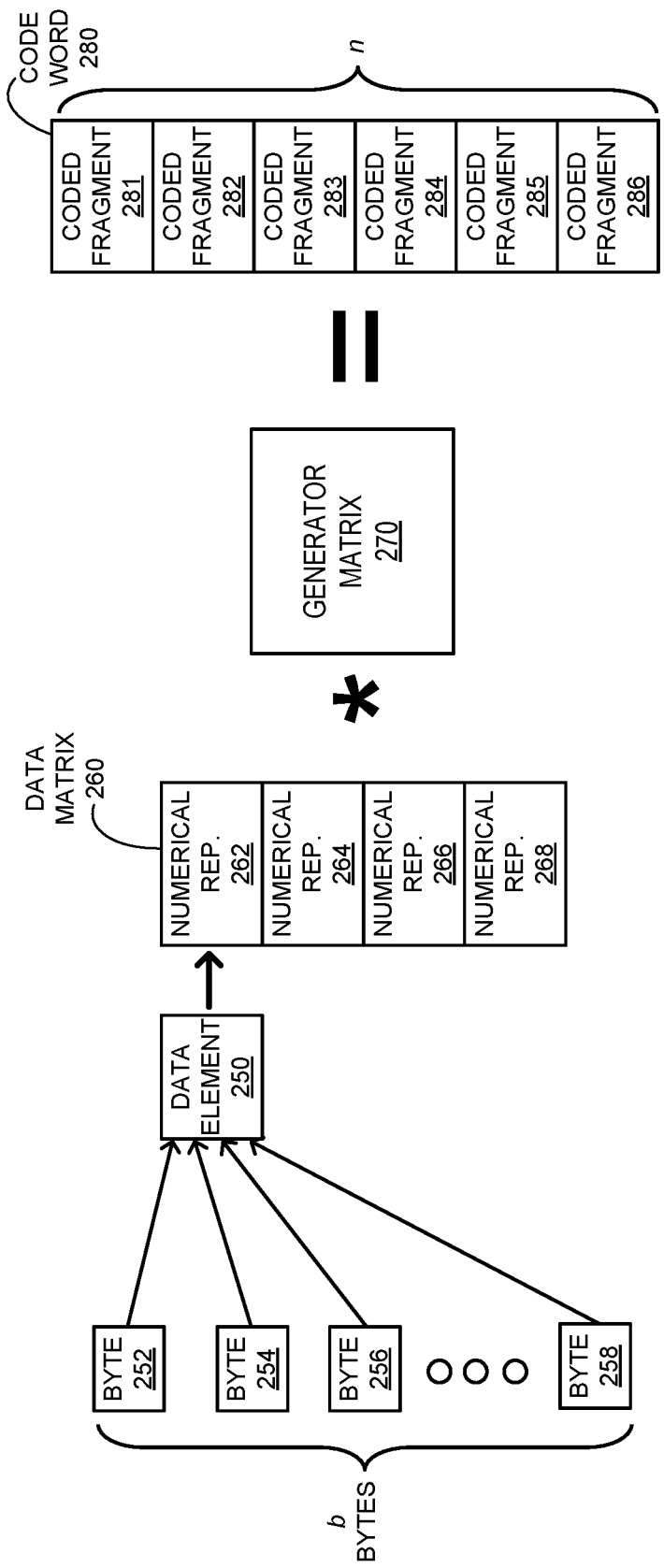
FIG. 2 illustrates exemplary numerical operation-based erasure coding for generating coded fragments of a data file, in accordance with an embodiment of the present invention.

FIG. 2 illustrates exemplary numerical operation-based erasure coding for generating coded fragments of a data file, in accordance with an embodiment of the present invention. During operation, a storage management system determines how many bits a data element should include. For example, if a computing device includes a 64-bit processor and/or includes a 64-bit bus, the system can determine to include 64 bits or 8 bytes in a data element. In this example, the system includes b bytes, comprising bytes 252, 254, 256, and 258, from a data file in a data element 250.

The system then represents data element 250 in a numerical representation 262. For example, the system can convert the bits of data element 250 into a numerical data type. Such numerical data types can be a real number, an imaginary number, or a combination of real and imaginary numbers. In some embodiments, the system allocates a subset of bits of data element 250 as a set of carryover bits (or padding bits) to incorporate an overflow, if any, for the numerical operations performed on numerical representation 262. The system can determine an optimal number of carryover bits based on the maximum value that an overflow resulting from the numerical operations on numerical representation 262 can take.

In the same way, the system generates numerical representations 264, 266, and 268. In some embodiments, generating the numerical representations includes one or more of: a Fourier transformation of the data element; and a computation of amplitude and phase of the data element. The system may include padding bits in the corresponding data elements associated with numerical representations 264, 266, and 268. The system forms a data matrix 260 comprising numerical representations 262, 264, 266, and 268. In some embodiments, the system arranges the converted numerical representations 262, 264, 266, and 268, and corresponding carryover bits into a matrix representation (i.e., data matrix 260) in system memory and/or processor cache registers.

The system can also determine a generator matrix 270 based on the size of the data matrix and the number of coded fragments to be generated. In some embodiments, the number of matrix elements in data matrix 260 can be determined by the dimension of generator matrix 270 such that data matrix 260 and generator matrix 270 can be multiplied. For example, if the number of coded fragments to be generated is six and the minimum number of coded fragments needed to recover the data elements is four, generator matrix 270 should be a 6-by-4 matrix. Under such circumstances, the data matrix should be a 4-by-1 matrix. The system then multiplies data matrix 260 and generator matrix 270 to generate code word 280, which includes coded fragments 281, 282, 283, 284, 285, and 286. The system may use a subset of these coded fragments to recover the original data.

The system selects generator matrix 270 in such a way that the overflow resulting from the multiplication is relatively small (i.e., can be represented by the carryover bits). In some embodiments, the overflow is less than or equal to the maximum of the respective summation of each row of generator matrix 270. The summation can be the summation of the elements of a row, wherein the number of elements in a row is equal to the number of columns in generator matrix 270. In some embodiments, generator matrix 270 is for non-systematic erasure coding, which combines original data and parity data as encoded bits. This provides implicit data security by avoiding data in plaintext. For example, coded fragments 281, 282, 283, 284, 285, and 286 are not in plaintext. As a result, an individual coded fragment does not reveal any part of the original data.

This calculation may further be used to determine the minimum number of padding bits added to data element 250. The padding bits may vary depending on the input data size and number of fragments being generated. The fewer the carryover bits, the more bits in data element 250 can be used to incorporate data from the data stream. For example, for a 64-bit computer, data element 250 can include 64 bits or 8 bytes. The system then can allocate seven bytes for data and one byte for padding bits. However, if the system determines that only four bits are needed to incorporate the overflow, the system can use an additional four bits to represent data. In some embodiments, only the data portion of data element 250 is represented in a numerical representation.

The multiplication between data matrix 260 and generator matrix 270 can include simple numerical operations, which are typically faster than linear arithmetic or table lookup operations used in Galois fields. Examples of numerical operations include, but are not limited to, addition, subtraction, multiplication, division, shifting, substitution, mix column, and logical (AND, OR and XOR) operations. As a result, the numerical operation-based erasure coding uses fewer computing cycles, faster computation, and higher throughput for the storage systems while providing data privacy.

Furthermore, a numerical representation can be more scalable. For example, Galois field operations are 8-bit operations while numerical representations can be 16, 32, 64, and 128 bits or more. As a result, numerical operation-based erasure coding results in higher speed and throughput. In addition, the system can use well-known techniques to optimize numerical operations associated with the matrix multiplication. Numerical operations can further benefit from hardware accelerations with vector instruction sets. If the computing system includes dedicated hardware support (e.g., Graphic Processing Units (GPU)), the system can select numerical data type and operations that can utilize such hardware.

To recover the original data, the system determines the minimum number of error-free coded fragments needed to retrieve the data elements. Suppose that the number of coded fragments is n and the minimum number of coded fragments needed to retrieve the data is k (wherein n>k). The system then selects k error-free coded fragments from the n coded fragments. Criteria for selecting the k error-free coded fragments from the n coded fragments include, but are not limited to, one or more of: first available error-free fragments, data location, storage and network transfer speed, and system load.

The system also determines an appropriate decoder matrix, whose elements can be real numbers. The matrix elements can also be fractions without repeating decimals that may cause rounding errors. The decoder matrix can be fixed for generator matrix 270 and the selected k coded fragments. For different k coded fragments, the corresponding decoder matrix can be pre-calculated from generator matrix 270. When needed, the system can retrieve the decoder matrix corresponding to the selected k coded fragments. The system multiplies the selected k coded fragments, which can be represented as a coded matrix, with the decoder matrix to generate the original data elements. The system can remove the carryover bits from these data elements and convert the numerical representations into the original data file.

Furthermore, the system can determine whether one or more of the n coded fragments are unavailable. The system then determines the minimum number of error-free coded fragments needed to recover the unavailable coded fragments and selects them from the remaining coded fragments needed to recreate the unavailable coded fragments. The system also obtains a recovery matrix by inverting a sub-matrix, which corresponds to the selected m coded fragments, of generator matrix 270. The system then multiplies the selected coded fragments and the recovery matrix to reconstruct the unavailable coded fragments. It should be noted that this matrix multiplication can recover all unavailable coded fragments. In this way, the embodiments of the present invention can avoid a repeated recovery process for individual unavailable coded fragments.

Initialization Operations

Figure 3A:
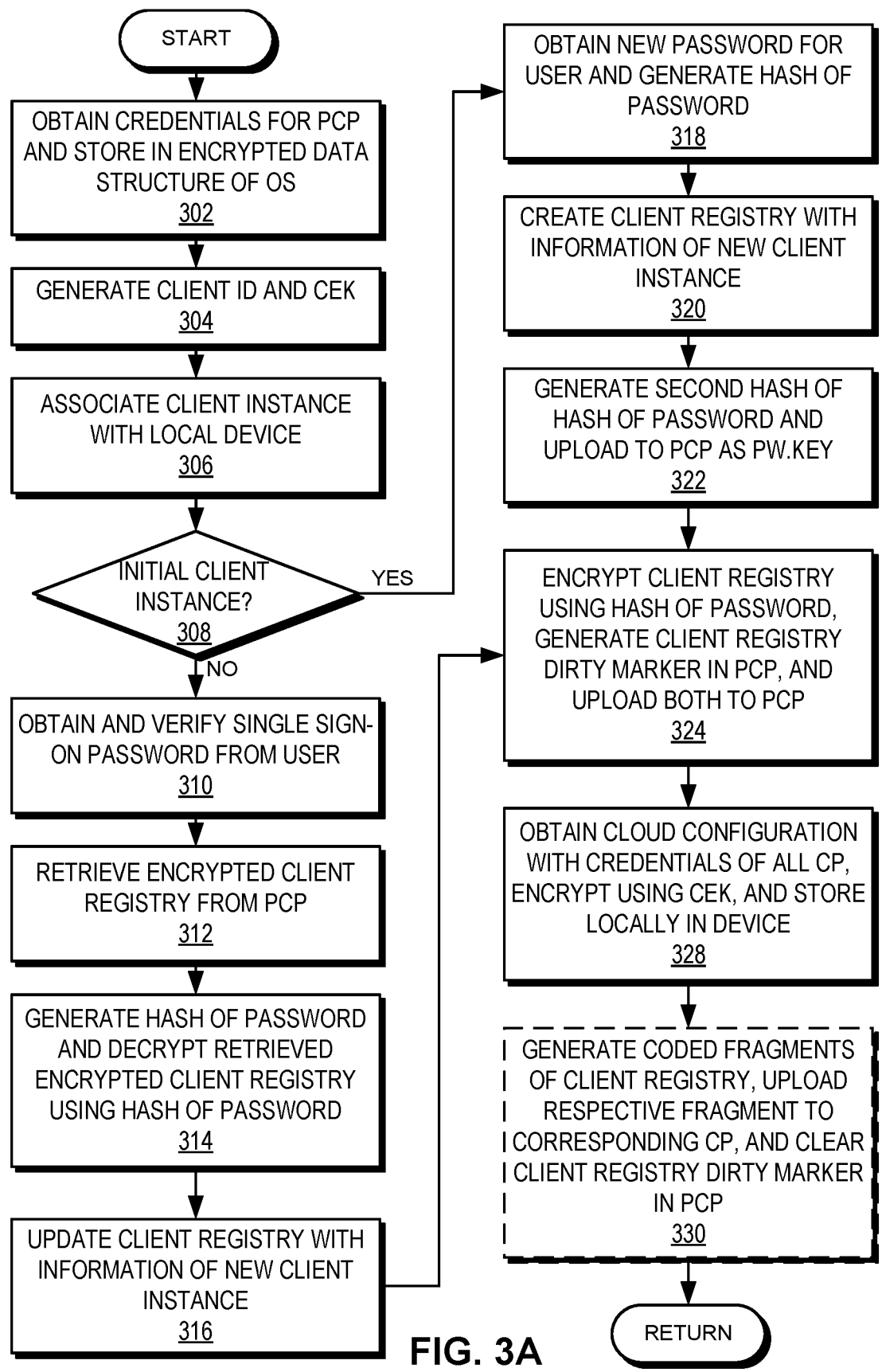
FIG. 3A presents a flowchart illustrating an exemplary installation and initialization process of a client instance of a storage management system on a user device, in accordance with an embodiment of the present invention.

FIG. 3A presents a flowchart illustrating an exemplary installation and initialization process of a client instance of a storage management system on a user device, in accordance with an embodiment of the present invention. During operation, upon installation of the storage management system on the user device, the client instance obtains the credentials for the PCP and stores the credentials in the encrypted data structure of the operating system of the user device (operation 302) (e.g., in the keychain of the operating system). If the PCP is Google Drive, the client instance obtains credentials for the user's Google account that has access to the Google Drive. The client instance generates a client instance identifier and a CEK for the client instance (operation 304).

The client instance associates the client instance with the local device (operation 306). In some embodiments, the association includes generating a mapping between identification data that associates the user device (e.g., device operating system, device name, etc.) with the client instance (e.g., a client instance identifier). The client instance checks whether the client instance is the initial one (operation 308). In some embodiments, the client instance determines this by generating a prompt that asks the user to enter an existing password or create an account. If the user chooses to create an account, the client instance determines that the local client instance is the initial one.

If the local client instance is not the initial one, the system has been installed on at least another user device. The client instance then obtains and verifies a single sign-on (SSO) password (i.e., a password that is associated with a respective client instance of the user account) from the user (operation 310). Here, the password is obtained based on a password retrieval policy of the system (e.g., the valid password must be entered within a predefined number of attempts). The client instance verifies the password by generating a second hash of the hash of the password and checking the second hash against the pw.key stored in the PCP. The client instance then retrieves the encrypted client registry from the PCP using the credentials of the PCP (operation 312). The client instance then generates a hash of the password and decrypts the retrieved encrypted client registry using the hash of the password (operation 314).

The client instance then updates the client registry with information of the new client instance (e.g., with the information generated in operations 304 and 306) (operation 316). If the client instance is the initial one, the client instance obtains a new password for the user, which is tied to all client instances, and generates a hash of the password (operation 318). The client instance creates a client registry with the information of the new client instance (operation 320). The client instance also generates a second hash of the hash of the password and uploads the second hash as pw.key to the PCP (operation 322). This pw.key is used to verify the password for all client instances, as described in conjunction with operation 310. Furthermore, the pw.key facilitates storing of the salt required to get the hash of the password.

Upon updating the client registry (operation 316) or generating the second hash (operation 322), the client instance encrypts the client registry using the hash of the password, generates a client registry dirty marker, and uploads both to the PCP (operation 324). The client registry dirty marker can be a flag indicating that the encrypted client registry has been updated and the unencrypted client registry should be updated. The client instance obtains the cloud configuration with credentials of all CPs from the user, encrypts the cloud configuration using the CEK, and stores the encrypted cloud configuration locally in the device (operation 328). The client instance can provide options to the user to enter credentials for as many CPs as are supported by the system. In some embodiments, based on the client registry dirty marker, the client instance can, optionally, generate coded fragments of the client registry, upload a respective fragment to a corresponding CP, and clear the client registry dirty marker in the PCP (operation 330) (an optional operation is denoted with dashed lines).

Figure 3B:
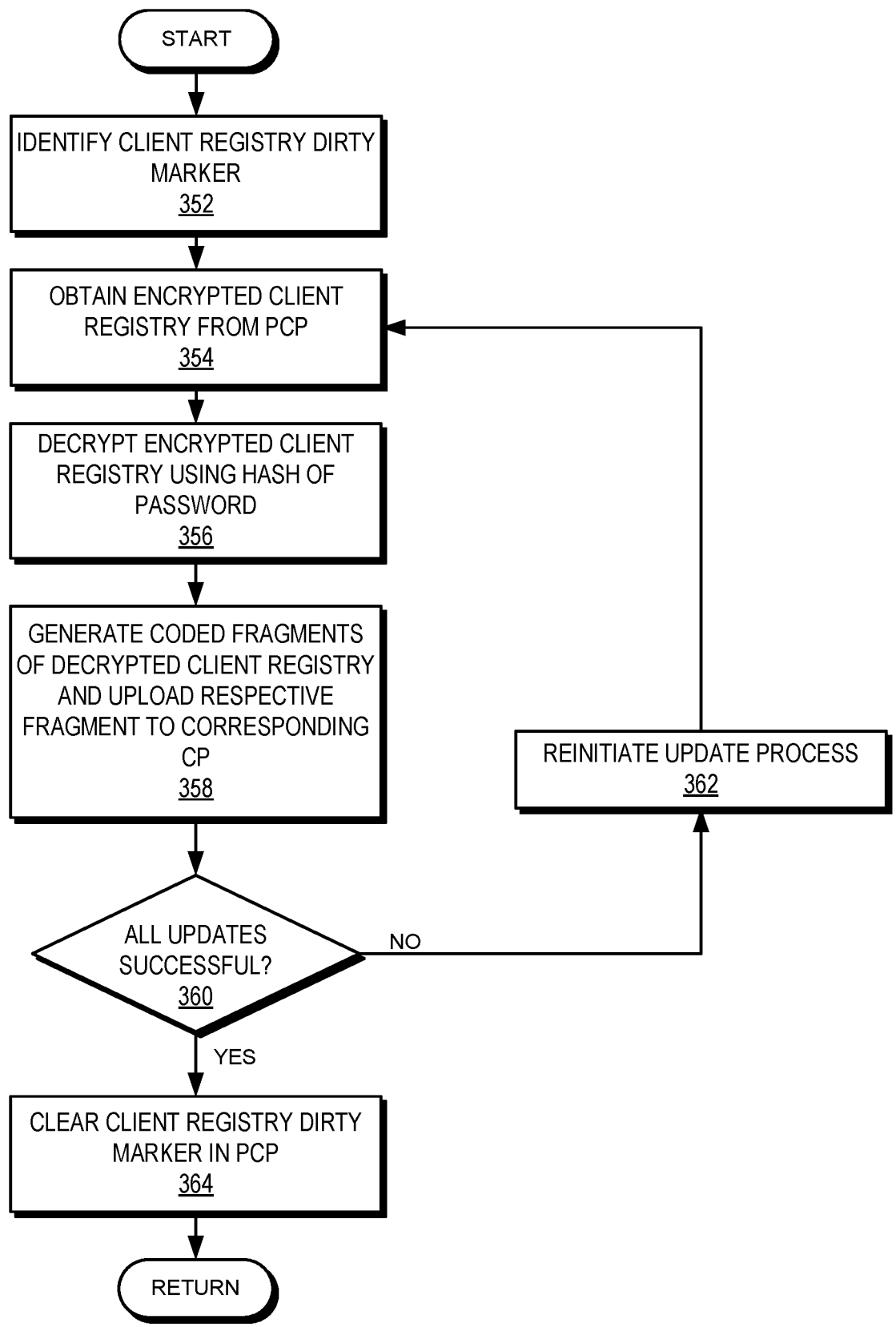
FIG. 3B presents a flowchart illustrating an exemplary process of a client instance updating an unencrypted client registry, in accordance with an embodiment of the present invention.

FIG. 3B presents a flowchart illustrating an exemplary process of a client instance updating an unencrypted client registry, in accordance with an embodiment of the present invention. If the unencrypted client registry has not been uploaded in the process described in conjunction with FIG. 3A, the client registry dirty marker remains present in the PCP. During operation, the client instance identifies the client registry dirty marker (operation 352) and obtains the encrypted client registry from the PCP (operation 354). The client instance decrypts the encrypted client registry using the hash of the password (operation 356). The client instance generates coded fragments of the unencrypted client registry and uploads a respective fragment to a corresponding CP (operation 358).

The client instance then checks whether all uploads have been successful (operation 360). If successful, the client instance clears the client registry dirty marker in the PCP (operation 364). Otherwise, the client instance reinitiates the update process (operation 362). The client instance can also raise an error (e.g., an error message) to the user. Since this is an asynchronous process, multiple client instances may detect the client registry dirty marker and initiate this process. If the coded fragments for a client registry are always the same (e.g., if the same generator matrix is used), such a conflict can still result in storing the correct unencrypted client registry.

However, if two client instances are initialized simultaneously, a race condition can occur (e.g., if the details of the local client instance are not present in the downloaded encrypted client registry). In this case, the last update to the client registry should be considered as the current unencrypted client registration. If the registration process fails, the client instance reinitiates the update process (operation 362). In some embodiments, a respective client instance can periodically check whether the unencrypted client registry matches the data in the encrypted client registry.

Credential Management Operations

Figure 4A:
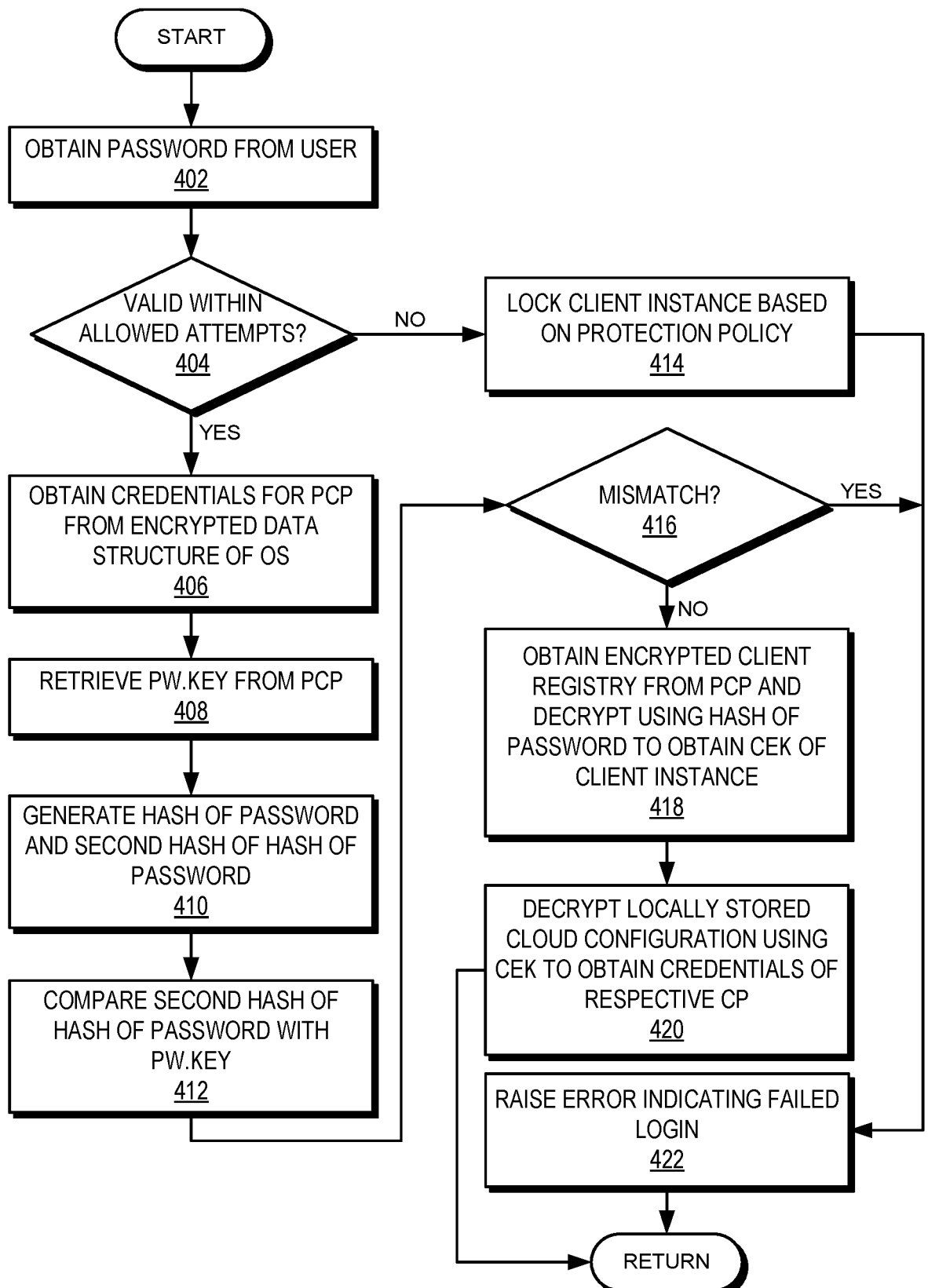
FIG. 4A presents a flowchart illustrating an exemplary logging-in process of a client instance, in accordance with an embodiment of the present invention.

FIG. 4A presents a flowchart illustrating an exemplary logging-in process of a client instance, in accordance with an embodiment of the present invention. During operation, the client instance obtains the password from the user (operation 402) and checks whether the password is valid within the allowed number of attempts (e.g., the valid password must be entered within a predefined number of attempts) (operation 404). If the password is valid within the allowed number of attempts, the client instance obtains the credentials for the PCP from the encrypted data structure of the operating system (operation 406) and retrieves the pw.key from the PCP (operation 408).

The client instance then generates a hash of the password and a second hash of the hash of the password (operation 410) and compares the second hash of the password with the pw.key (operation 412). The client instance checks for a mismatch between the second hash and the pw.key (operation 416). If the client instance does not detect a mismatch, the client instance obtains the encrypted client registry from the PCP and decrypts the encrypted client registry using the hash of the password to obtain the CEK associated with the client instance (operation 418). The client instance decrypts the locally stored cloud configuration using the CEK to obtain the credentials of a respective CP (operation 420).

If the password is not valid within the allowed number of attempts (operation 404), the client instance locks the client instance (i.e., the system application on the device) based on a protection policy (operation 414) and raises an error indicating a failed login (operation 422). The protection policy can specify the duration for which the client instance remains locked and how the lock may be removed. If the client instance detects a mismatch between the second hash and the pw.key (operation 416), the client instance raises an error indicating a failed login (operation 422).

Figure 4B:
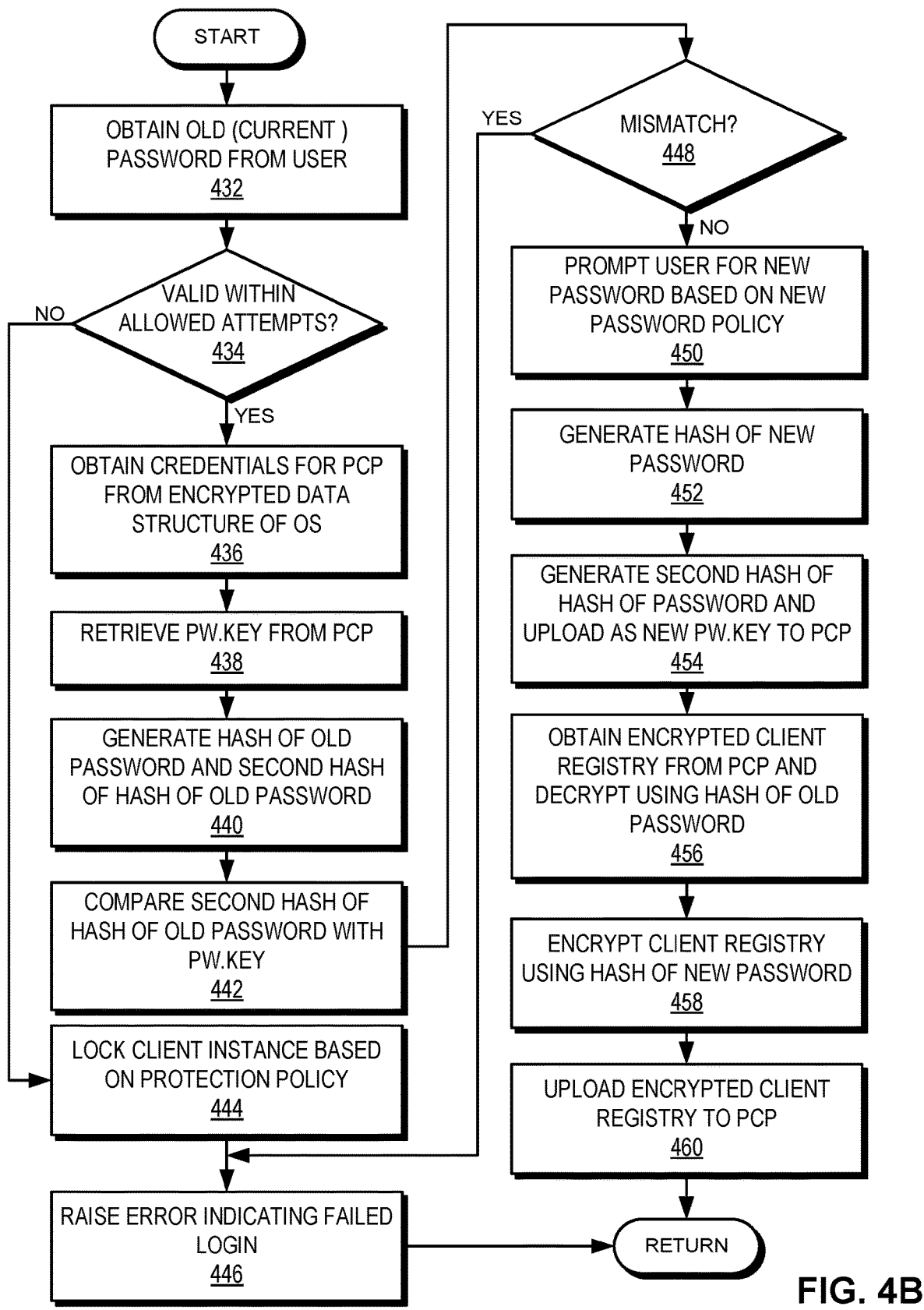
FIG. 4B presents a flowchart illustrating an exemplary process of a client instance changing a password, in accordance with an embodiment of the present invention.

FIG. 4B presents a flowchart illustrating an exemplary process of a client instance changing a password, in accordance with an embodiment of the present invention. During operation the client instance obtains the old (current) password from the user (operation 432) and checks whether the password is valid within the allowed number of attempts (operation 434). If the password is valid within the allowed number of attempts, the client instance obtains the credentials for the PCP from the encrypted data structure of the operating system (operation 436) and retrieves pw.key from the PCP (operation 438).

The client instance then generates a hash of the password and a second hash of the hash of the old password (operation 440) and compares the second hash of the old password with the pw.key (operation 442). The client instance checks for a mismatch between the second hash and the pw.key (operation 448). If the client instance does not detect a mismatch, the client instance prompts the user for a new password based on a password policy (operation 450). The password policy can indicate what the password should include and exclude. For example, the password policy can indicate that the password should include a number, an uppercase letter, and a symbol, and should not include a previous password.

Upon obtaining a new password, the client instance generates a hash of the new password (operation 452), and generates a second hash of the hash of the new password and uploads the second hash as the new pw.key to the PCP (operation 454). The client instance obtains the encrypted client registry from the PCP and decrypts the encrypted client registry using the hash of the old password (operation 456). The client instance then encrypts the client registry using the hash of the new password (operation 458) and uploads the newly encrypted client registry to the PCP (operation 460). If the password is not valid within the allowed number of attempts (operation 434), the client instance locks the client instance based on a protection policy (operation 444) and raises an error indicating a failed login (operation 446). If the client instance detects a mismatch between the second hash and the pw.key (operation 448), the client instance raises an error indicating a failed login (operation 446).

Figure 4C:
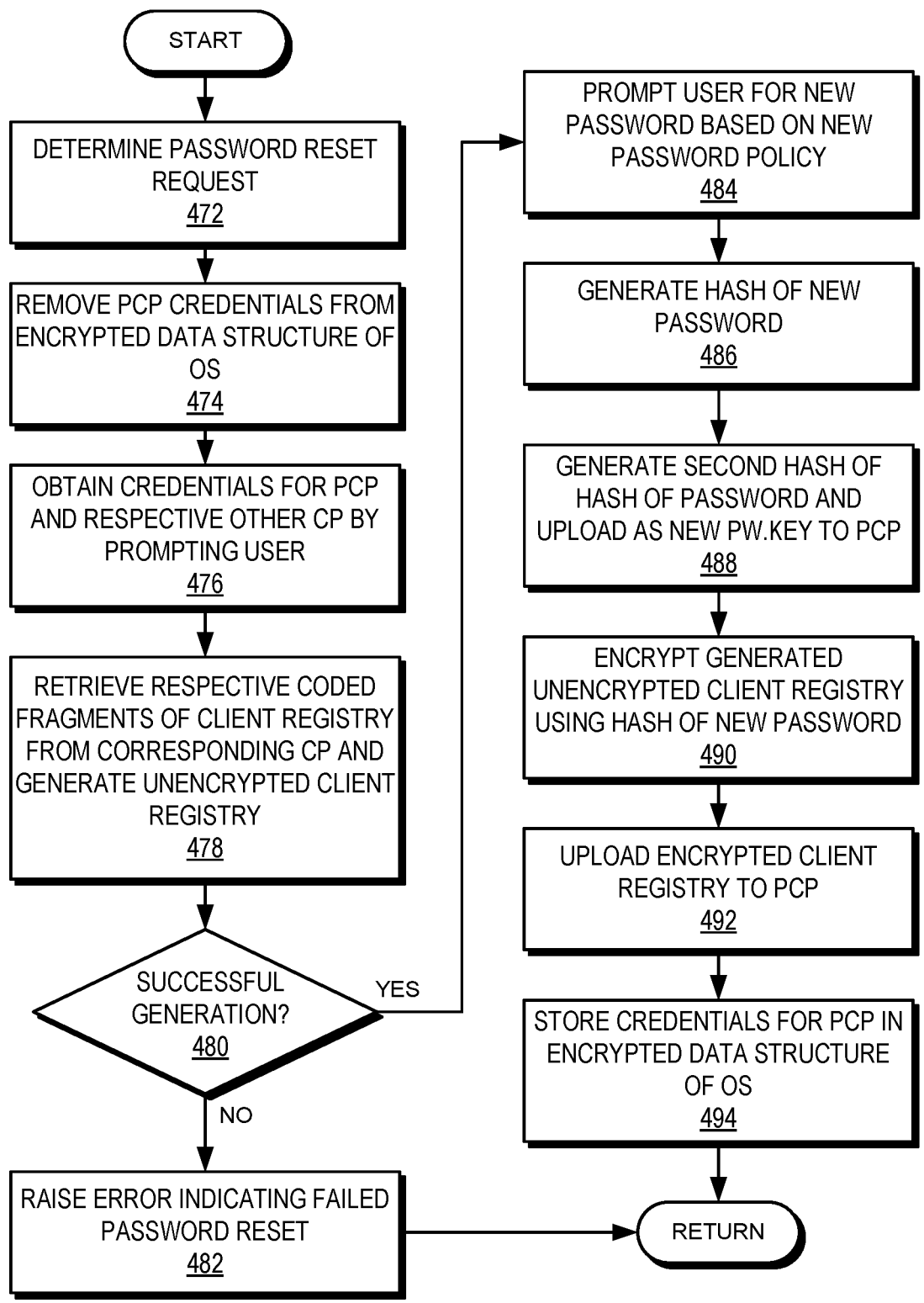
FIG. 4C presents a flowchart illustrating an exemplary process of a client instance resetting a password, in accordance with an embodiment of the present invention.

FIG. 4C presents a flowchart illustrating an exemplary process of a client instance resetting a password, in accordance with an embodiment of the present invention. During operation, the client instance determines a password reset request (operation 472) and removes the PCP credentials from the encrypted data structure of the operating system (operation 474). The client instance then obtains the credentials for the PCP and a respective other CP by prompting the user (i.e., from the user) (operation 476). The client instance retrieves a respective coded fragment of the client registry from the corresponding CP and generates the unencrypted client registry from the coded fragments (operation 478).

The client instance checks whether the client registry has been successfully generated (operation 480). If successfully generated, the client instance prompts the user for a new password based on a password policy (operation 484). Upon obtaining a new password, the client instance generates a hash of the new password (operation 486), and generates a second hash of the hash of the new password and uploads the second hash as the new pw.key to the PCP (operation 488). The client instance encrypts the generated unencrypted client registry (from operation 478) using the hash of the new password (operation 490). Here, a dirty marker for the client registry is not needed because the unencrypted client registry has not been changed. Furthermore, a new encrypted cloud configuration is not needed because the credentials for the CPs have not been changed.

The client instance then uploads the newly encrypted client registry to the PCP (operation 492). The client instance also stores the credentials for the PCP to the encrypted data structure of the operating system (operation 494). If the unencrypted client registry is not successfully generated (operation 480), the client instance raises an error indicating a failed password reset (operation 482). For example, if the user fails to provide the credentials to a CP, the coded fragment of the client registry stored in the CP would not be retrieved. As a result, the unencrypted client registry would not be successfully generated, thereby ensuring that the user needs to provide the credential for a respective CP.

Data Management Operations

Figure 5:
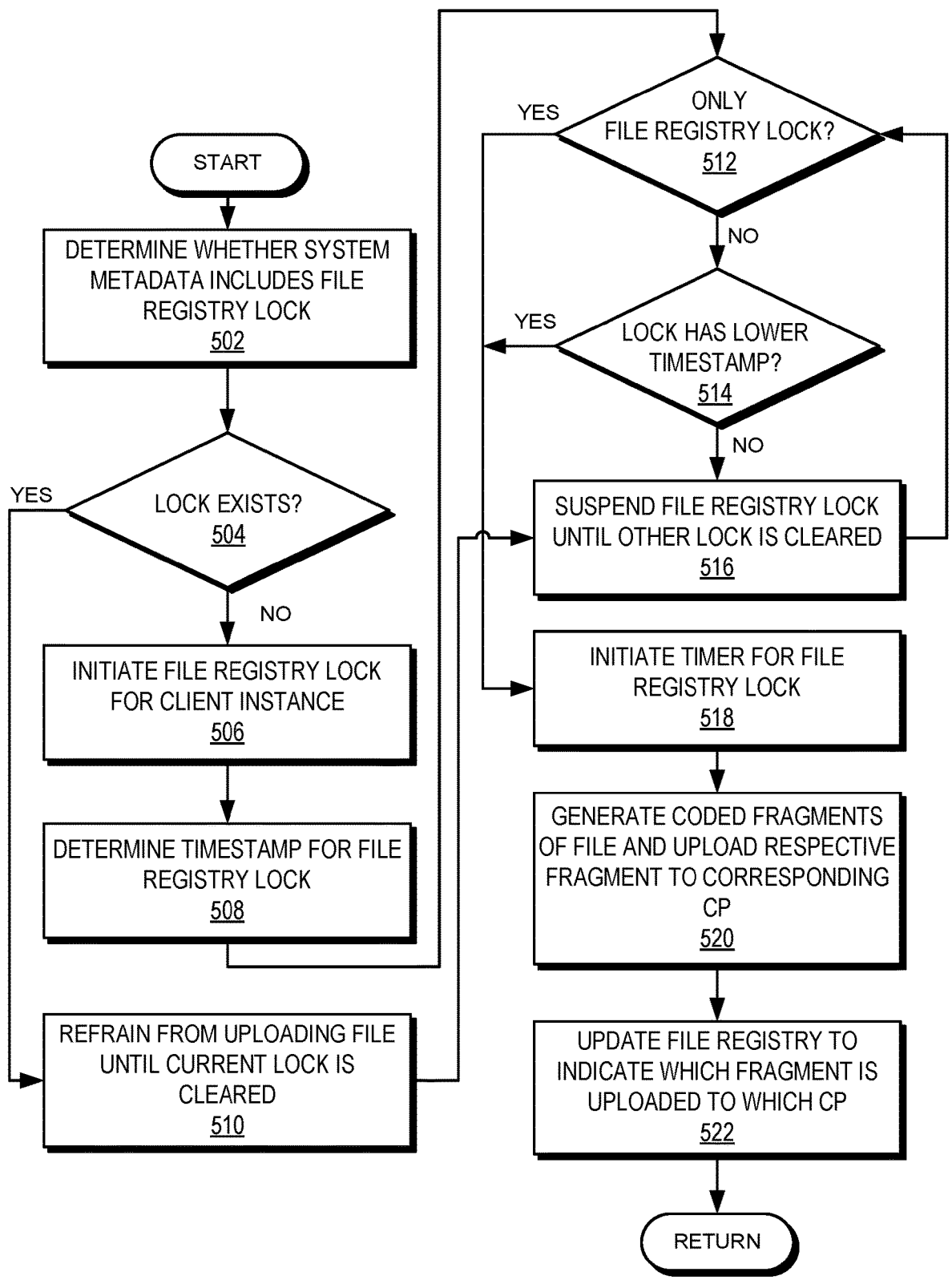
FIG. 5 presents a flowchart illustrating an exemplary process of a client instance uploading a user data file across a plurality of cloud providers, in accordance with an embodiment of the present invention.

FIG. 5 presents a flowchart illustrating an exemplary process of a client instance uploading a user data file across a plurality of cloud providers, in accordance with an embodiment of the present invention. During operation, the client instance determines whether the system metadata includes a file registry lock (operation 502). The system metadata can include the cloud configuration, the file registry, and the client registry. If the lock exists, the client instance refrains from uploading the file until the current lock is cleared (operation 510).

If the lock does not exist, the client instance initiates a file registry lock for the current instance (operation 506) and determines a timestamp for the file registry lock (operation 508). The client instance checks whether the file registry lock is the only lock for all the client instances (operation 512). If the file registry lock is not the only lock, the client instance then checks whether the file registry lock has a lower timestamp (operation 514). If the file registry lock does not have a lower timestamp (operation 514) or the client instance has refrained from uploading the file until the current lock is cleared (operation 510), the client instance suspends the file registry lock until the other lock is cleared (operation 516).

On the other hand, if the file registry lock is the only lock (operation 512) or has a lower timestamp (operation 514), the client instance initiates a timer for the file registry lock (operation 518). The client instance releases the lock if the timer expires. The client instance then generates the coded fragments of the file and uploads a respective coded fragment to a corresponding CP (operation 520) and updates the file registry to indicate which coded fragment is uploaded to which CP (operation 522). The updated file registry can include one or more of: name and path of the file, location and order of each coded fragment, and additional metadata, if needed. It should be noted that the file registry does not include credentials or any information that grants access to another CP.

Error Management Operations

Figure 6A:
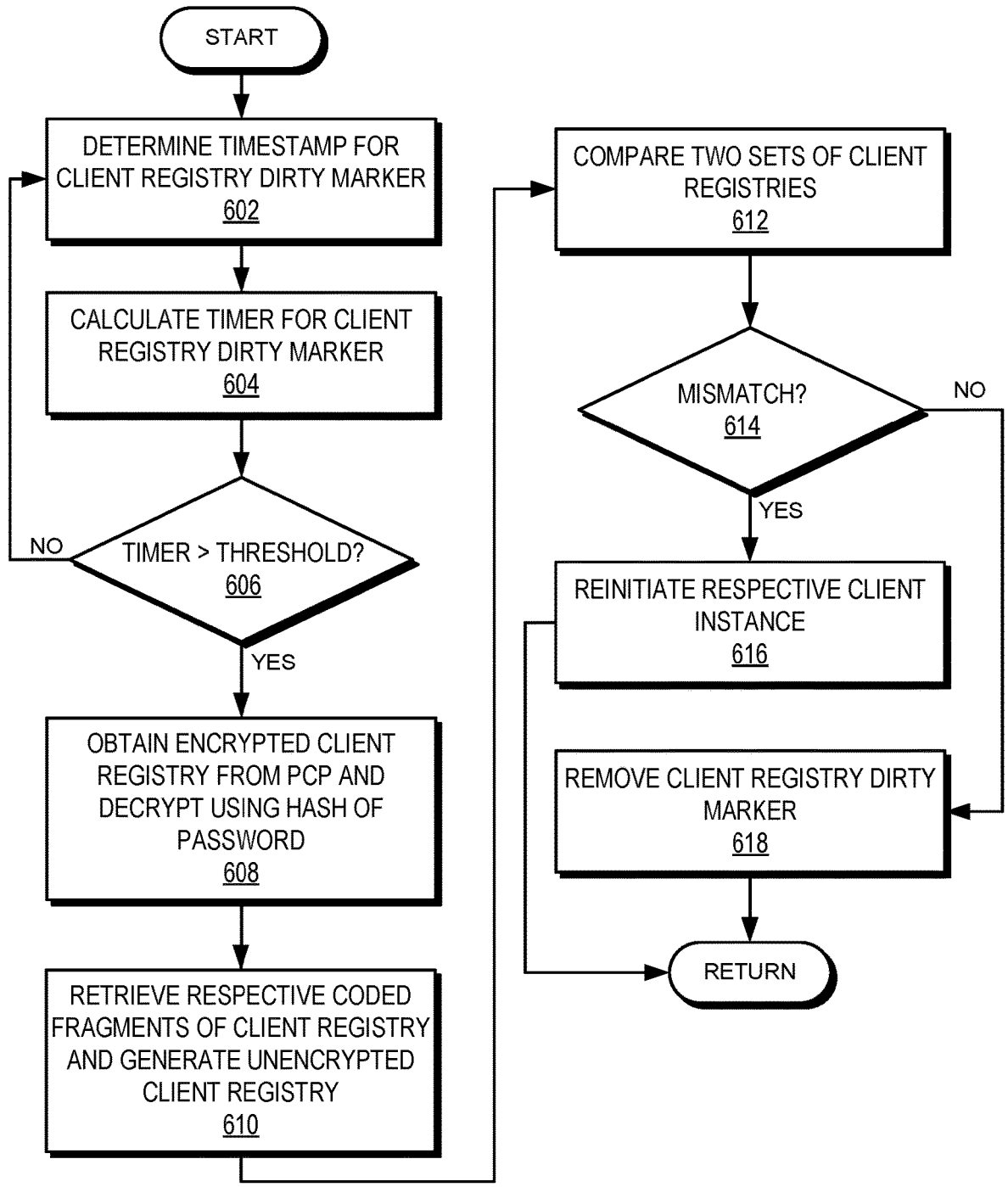
FIG. 6A presents a flowchart illustrating an exemplary error-handling process of a client instance, in accordance with an embodiment of the present invention.

FIG. 6A presents a flowchart illustrating an exemplary error-handling process of a client instance, in accordance with an embodiment of the present invention. During operation, the client instance determines the timestamp for the client registry dirty marker (operation 602) and calculates a timer for the client registry dirty marker (operation 604). The client instance then checks whether the timer is greater than a threshold (operation 606). The threshold can be a value that the user may configure or the client instance may assign. If the timer is not greater than the threshold, the client instance continues to determine the current timestamp for the client registry dirty marker (operation 602) and calculates a timer for the client registry dirty marker (operation 604).

If the timer is greater than the threshold, the client instance obtains the encrypted client registry from the PCP and decrypts the encrypted client registry using the hash of the password (operation 608). The client instance also retrieves a respective coded fragment of the client registry and generates the unencrypted client registry (operation 610). The client instance compares the two sets of client registries (operation 612) and determines whether these sets have a mismatch (operation 614). If the client instance determines a mismatch, the client instance reinitiates a respective client instance (operation 616). If no mismatch is detected, the client instance removes the client registry dirty marker (operation 618).

Figure 6B:
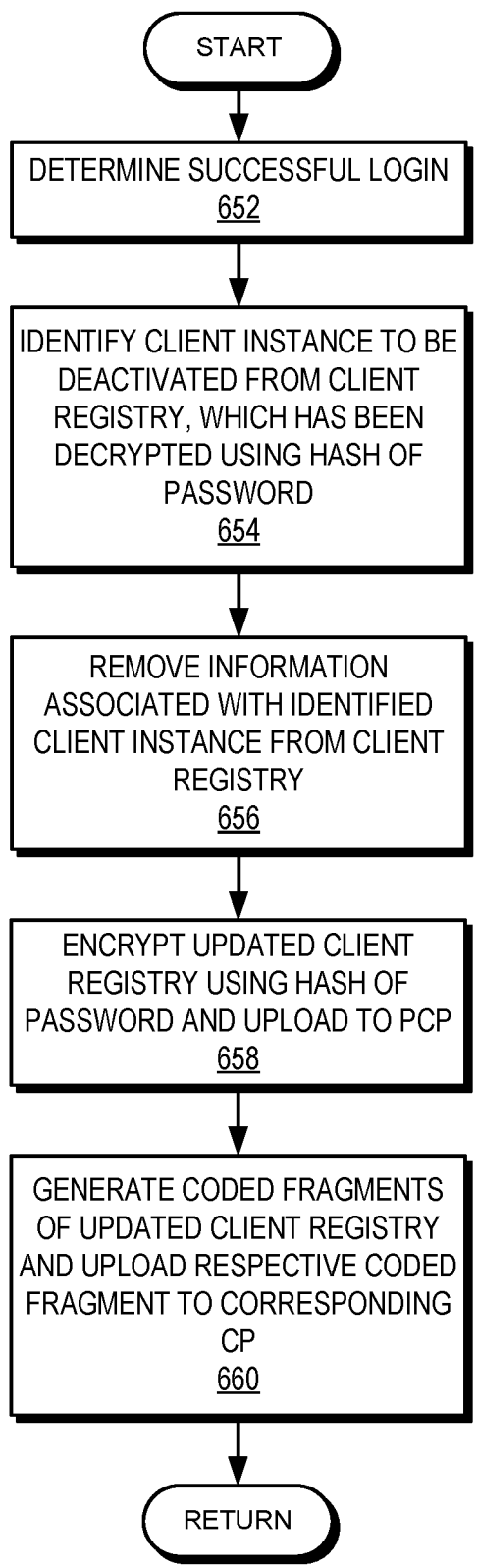
FIG. 6B presents a flowchart illustrating an exemplary process of a client instance deactivating another client instance, in accordance with an embodiment of the present invention.

If a device becomes unavailable to the user (e.g., due to loss or theft), the user may deactivate the client instance of the unavailable device. FIG. 6B presents a flowchart illustrating an exemplary process of a client instance deactivating another client instance, in accordance with an embodiment of the present invention. During operation, the client instance determines a successful login (operation 652) and identifies the client instance to be deactivated from the client registry, which has been decrypted using the hash of the password (operation 654) (e.g., based on the client instance identifier). The client instance removes information associated with the identified client instance from the client registry (operation 656).

Removing information associated with the identified client instance from the client registry removes the CEK of the identified client instance from the PCP. As a result, the identified client instance would not be able to decrypt the cloud configuration and become deactivated. The client instance then encrypts the updated client registry using the hash of the password and uploads the encrypted client registry to the PCP (operation 658). The client instance generates the coded fragments of the client registry and uploads a respective coded fragment to a corresponding CP (operation 660).

Exemplary Computer and Communication System

Figure 7:
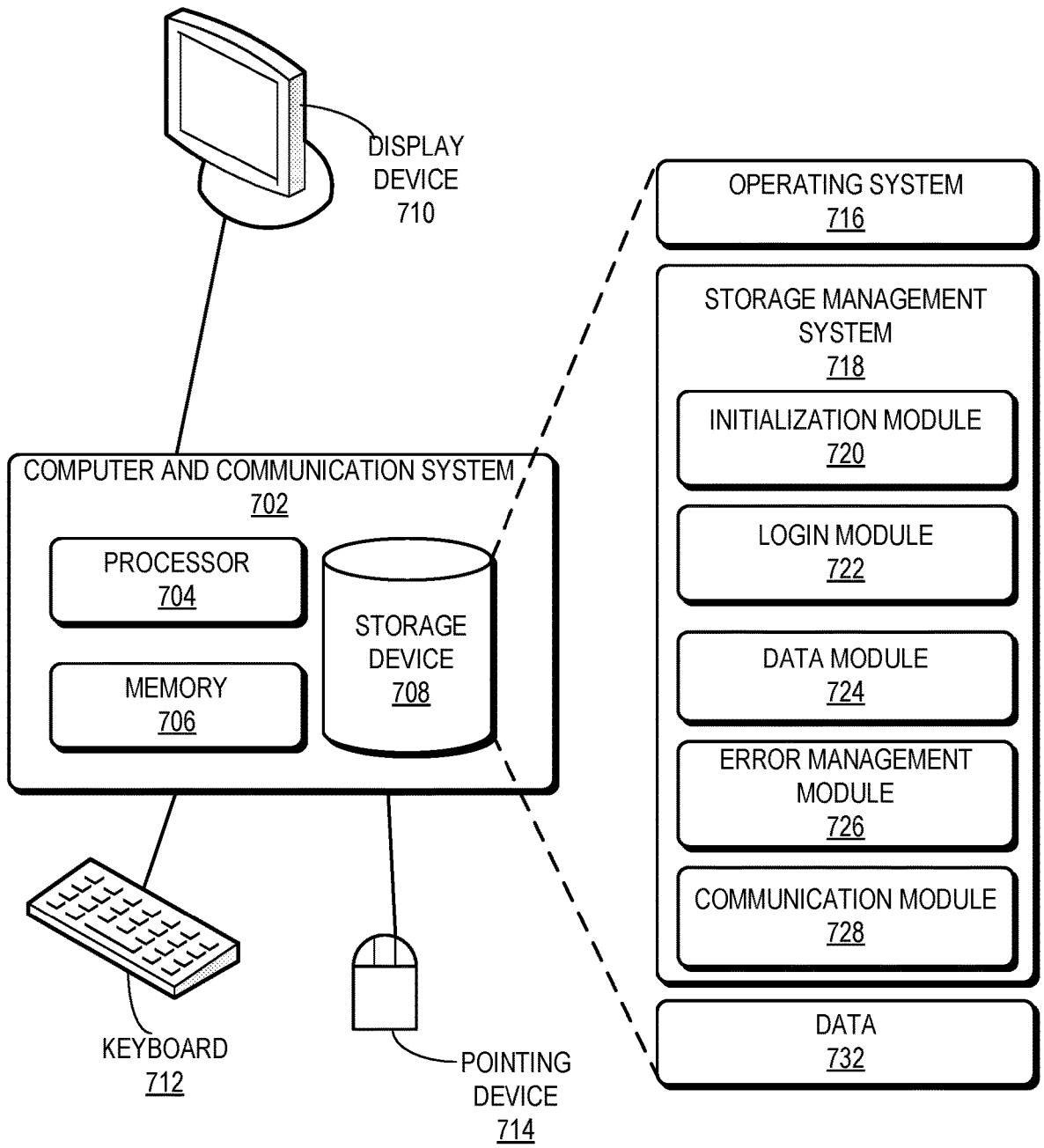
FIG. 7 illustrates an exemplary computer and communication system facilitating a storage management system that stores user data across multiple cloud providers, in accordance with an embodiment of the present invention.

FIG. 7 illustrates an exemplary computer and communication system facilitating a storage management system that stores user data across multiple cloud providers, in accordance with an embodiment of the present invention. A computer and communication system 702 includes a processor 704, a memory 706, and a storage device 708. Memory 706 can include a volatile memory (e.g., RAM) that serves as a managed memory, and can be used to store one or more memory pools. Furthermore, computer and communication system 702 can be coupled to a display device 710, a keyboard 712, and a pointing device 714. Storage device 708 can store an operating system 716, a storage management system 718, and data 732.

Storage management system 718 can include instructions, which when executed by computer and communication system 702, can cause computer and communication system 702 to perform the methods and/or processes described in this disclosure. Storage management system 718 includes instructions for initialization of storage management system 718 on computer and communication system 702 (initialization module 720), as described in conjunction with FIGS. 3A and 3B. Storage management system 718 also includes instructions for managing login information of a user of storage management system 718 (login module 722), as described in conjunction with FIGS. 4A, 4B, and 4C.

Storage management system 718 further includes instructions for uploading a data file to the CPs by generating coded fragments of the data file using numerical operation-based erasure coding (data module 724), as described in conjunction with FIG. 5. Storage management system 718 further includes instructions for managing race condition and errors (error management module 726), as described in conjunction with FIGS. 6A and 6B. Storage management system 718 can also include instructions for exchanging information with the CPs via a network (communication module 728).

Data 732 can include any data that is required as input or that is generated as output by the methods and/or processes described in this disclosure. For example, data 732 can include the credentials of a PCP stored in an encrypted data structure of operating system 716, and the cloud configuration encrypted by the CEK associated with computer and communication system 702. It should be noted that storage management system 718 can be considered as a client instance running on computer and communication system 702.

The data structures and code described in this detailed description are typically stored on a computer-readable storage medium, which may be any device or medium that can store code and/or data for use by a computer system. The computer-readable storage medium includes, but is not limited to, volatile memory, non-volatile memory, magnetic and optical storage devices such as disk drives, magnetic tape, CDs (compact discs), DVDs (digital versatile discs or digital video discs), or other media capable of storing computer-readable media now known or later developed.

The methods and processes described in the detailed description section can be embodied as code and/or data, which can be stored in a computer-readable storage medium as described above. When a computer system reads and executes the code and/or data stored on the computer-readable storage medium, the computer system performs the methods and processes embodied as data structures and code and stored within the computer-readable storage medium.

Furthermore, the methods and processes described above can be included in hardware modules or apparatus. The hardware modules or apparatus can include, but are not limited to, application-specific integrated circuit (ASIC) chips, field-programmable gate arrays (FPGAs), dedicated or shared processors that execute a particular software module or a piece of code at a particular time, and other programmable-logic devices now known or later developed. When the hardware modules or apparatus are activated, they perform the methods and processes included within them.

The foregoing descriptions of embodiments of the present invention have been presented for purposes of illustration and description only. They are not intended to be exhaustive or to limit the present invention to the forms disclosed. Accordingly, many modifications and variations will be apparent to practitioners skilled in the art. Additionally, the above disclosure is not intended to limit the present invention. The scope of the present invention is defined by the appended claims.

What is claimed is:

1. A method, comprising:
   identifying, by a device of a user, a data file to be uploaded to a cloud storage of the user;
   obtaining an encrypted client registry from a primary cloud provider in a plurality of cloud providers that provide cloud storage to the user, wherein the client registry comprises a key associated with the device;
   decrypting the encrypted client registry using a hash of a password associated with the user that allows the user to access the primary cloud provider;
   retrieving the key associated with the device from the decrypted client registry;
   decrypting a locally stored cloud configuration using the key;
   obtaining credentials of the plurality of cloud providers from the decrypted locally stored cloud configuration;
   generating a plurality of coded fragments from the data file by applying a generator matrix of erasure encoding to the data file, wherein a cardinality of the plurality of coded fragments corresponds to a cardinality of the plurality of cloud providers associated with the user; and
   selecting a respective cloud provider from the plurality of cloud providers for uploading a distinct coded fragment of the plurality of coded fragments.

2. The method of claim 1, wherein credentials for the primary cloud provider are included in an encrypted data structure of an operating system of the device.

3. The method of claim 1, further comprising storing a file registry in the primary cloud provider, wherein the file registry includes one or more of: a name and a path of the data file, location and order of a respective coded fragment of the data file, and additional metadata.

4. The method of claim 3, further comprising initializing a lock for the data file, wherein the lock prevents another device of the user from modifying the file registry.

5. The method of claim 1, further comprising verifying validity of the password by:
   generating a hash of the hash of the password;
   retrieving a password key from the primary cloud provider, wherein the password key is a previously generated hash of the hash of the password; and
   comparing the generated hash of the hash of the password with the password key.

6. The method of claim 1, wherein generating the plurality of coded fragments from the data file includes:
   obtaining a plurality of data elements from the data file;
   converting a respective data element in the plurality of data elements to a numerical representation;
   representing the numerical representations as a data matrix; and
   multiplying the data matrix with the generator matrix.

7. The method of claim 1, wherein, in response to detecting a request for a new password, the method further comprises:
   decrypting the encrypted client registry using the hash of the password;
   obtaining a new password from the user;
   encrypting the decrypted client registry using a hash of the new password; and
   storing a new password key comprising a hash of the hash of the new password in the primary cloud provider.

8. The method of claim 1, further comprising maintaining an unencrypted client registry by:
   generating a plurality of coded fragments of the unencrypted client registry; and
   storing a respective coded fragment of the unencrypted client registry in a corresponding cloud provider.

9. The method of claim 8, wherein, in response to detecting a request for resetting the password, the method further comprises:
   obtaining credentials for a respective cloud provider in the plurality of cloud providers from the user;
   obtaining a respective coded fragment of the unencrypted client registry from the corresponding cloud provider using the credentials of that cloud provider;
   generating the unencrypted client registry from the obtained coded fragments of the unencrypted client registry; and
   in response to a successful generation of the unencrypted client registry, prompting the user for a new password.

10. The method of claim 8, wherein, in response to detecting a marker indicating that the encrypted client registry has been updated, the method further comprises updating the unencrypted client registry by:
    retrieving the encrypted client registry from the primary cloud provider;
    decrypting the encrypted client registry using the hash of the password; and
    generating a plurality of coded fragments of the decrypted client registry.

11. A device of a user, the device comprising:
    a processor; and
    a storage device storing instructions that when executed by the processor cause the processor to perform a method, the method comprising:
    identifying a data file to be uploaded to a cloud storage of the user;

obtaining an encrypted client registry from a primary cloud provider in a plurality of cloud providers that provide cloud storage to the user, wherein the client registry comprises a key associated with the device;

decrypting the encrypted client registry using a hash of a password associated with the user that allows the user to access the primary cloud provider;

retrieving the key associated with the device from the decrypted client registry;

decrypting a locally stored cloud configuration using the key;

obtaining credentials of the plurality of cloud providers from the decrypted locally stored cloud configuration;

generating a plurality of coded fragments from the data file by applying a generator matrix of erasure encoding to the data file, wherein a cardinality of the plurality of coded fragments corresponds to a cardinality of the plurality of cloud providers associated with the user; and selecting a respective cloud provider from the plurality of cloud providers for uploading a distinct coded fragment of the plurality of coded fragments.

12. The device of claim 11, wherein credentials for the primary cloud provider are included in an encrypted data structure of an operating system of the device.

13. The device of claim 11, wherein the method further comprises storing a file registry in the primary cloud provider, wherein the file registry includes one or more of: a name and a path of the data file, location and order of a respective coded fragment of the data file, and additional metadata.

14. The device of claim 13, wherein the method further comprises initializing a lock for the data file, wherein the lock prevents another device of the user from modifying the file registry.

15. The device of claim 11, wherein the method further comprises verifying validity of the password by:
generating a hash of the hash of the password;
retrieving a password key from the primary cloud provider, wherein the password key is a previously generated hash of the hash of the password; and
comparing the generated hash of the hash of the password with the password key.

16. The device of claim 11, wherein generating the plurality of coded fragments from the data file includes:

obtaining a plurality of data elements from the data file;
converting a respective data element in the plurality of data elements to a numerical representation;
representing the numerical representations as a data matrix; and
multiplying the data matrix with the generator matrix.

17. The device of claim 11, wherein, in response to detecting a request for a new password, the method further comprises:
decrypting the encrypted client registry using the hash of the password;
obtaining a new password from the user;
encrypting the decrypted client registry using a hash of the new password; and
storing a new password key comprising a hash of the hash of the new password in the primary cloud provider.

18. The device of claim 11, wherein the method further comprises maintaining an unencrypted client registry by:
generating a plurality of coded fragments of the unencrypted client registry; and
storing a respective coded fragment of the unencrypted client registry in a corresponding cloud provider.

19. The device of claim 18, wherein, in response to detecting a request for resetting the password, the method further comprises:
obtaining credentials for a respective cloud provider in the plurality of cloud providers from the user;
obtaining a respective coded fragment of the unencrypted client registry from the corresponding cloud provider using the credentials of that cloud provider;
generating the unencrypted client registry from the obtained coded fragments of the unencrypted client registry; and
in response to a successful generation of the unencrypted client registry, prompting the user for a new password.

20. The device of claim 18, wherein, in response to detecting a marker indicating that the encrypted client registry has been updated, the method further comprises updating the unencrypted client registry by:
retrieving the encrypted client registry from the primary cloud provider;
decrypting the encrypted client registry using the hash of the password; and
generating a plurality of coded fragments of the decrypted client registry.

* * * * *